(12) United States Patent
Phipps et al.

(10) Patent No.: US 11,453,481 B2
(45) Date of Patent: Sep. 27, 2022

(54) AEROFOIL LEADING EDGE STRUCTURES

(71) Applicant: AIRBUS OPERATIONS LIMITED, Bristol (GB)

(72) Inventors: David Andrew Phipps, Bristol (GB); Vernon John Holmes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 325 days.

(21) Appl. No.: 16/800,129

(22) Filed: Feb. 25, 2020

(65) Prior Publication Data

US 2020/0283158 A1 Sep. 10, 2020

(30) Foreign Application Priority Data

Mar. 5, 2019 (GB) ..................................... 1902926

(51) Int. Cl.
*B64C 21/06* (2006.01)
*B64C 3/28* (2006.01)
*B64D 15/12* (2006.01)

(52) U.S. Cl.
CPC ................ *B64C 21/06* (2013.01); *B64C 3/28* (2013.01); *B64D 15/12* (2013.01); *B64C 2230/22* (2013.01)

(58) Field of Classification Search
CPC .......... B64C 21/025; B64C 21/06; B64C 3/28
See application file for complete search history.

(56) References Cited

U.S. PATENT DOCUMENTS

| | | | | |
|---|---|---|---|---|
| 2,742,247 A * | 4/1956 | Lachmann | ............. | B64C 21/06 244/119 |
| 3,521,837 A * | 7/1970 | Papst | ..................... | B64C 21/06 244/209 |
| 5,114,100 A * | 5/1992 | Rudolph | ................ | B64D 15/04 244/130 |
| 5,944,287 A * | 8/1999 | Rodgers | .................. | F02C 7/047 60/39.093 |
| 6,050,523 A * | 4/2000 | Kraenzien | ................. | B64C 9/00 244/130 |
| 6,202,304 B1 | 3/2001 | Shatz | | |
| 6,752,358 B1 * | 6/2004 | Williams | .................. | B64C 1/12 244/208 |

(Continued)

FOREIGN PATENT DOCUMENTS

CA 2628670 10/2008
DE 4414205 10/1995

(Continued)

OTHER PUBLICATIONS

Extended European Search Report for European Application No. 20157136.1, eight pages, dated Jul. 27, 2020.

(Continued)

*Primary Examiner* — Joseph W Sanderson
(74) *Attorney, Agent, or Firm* — Nixon & Vanderhye P.C.

(57) ABSTRACT

A leading edge structure for an aerofoil is disclosed. The leading edge structure includes a skin configured to form an external aerodynamic surface of the aerofoil. The skin includes a plurality of first regions interleaved with a plurality of second regions. Each first region includes a plurality of holes extending through the skin, and each second region includes an electrical heating system configured to increase the temperature of the skin.

16 Claims, 3 Drawing Sheets

(56) References Cited

U.S. PATENT DOCUMENTS

| | | | |
|---|---|---|---|
| 7,152,829 B2* | 12/2006 | Bertolotti | B64C 21/06 244/209 |
| 7,922,126 B2 | 4/2011 | Meister | |
| 9,745,053 B2* | 8/2017 | Teich | B64C 3/20 |
| 10,000,277 B2* | 6/2018 | Tiwari | B64C 7/02 |
| 10,377,464 B2* | 8/2019 | Cebolla Garrofe | B29C 69/001 |
| 11,186,358 B2* | 11/2021 | Hui | B64C 21/08 |
| 11,220,345 B2* | 1/2022 | Heck | B64C 21/06 |
| 2010/0294892 A1* | 11/2010 | Syassen | B64C 21/06 244/209 |
| 2016/0107746 A1* | 4/2016 | Tiwari | B64C 21/06 219/121.72 |
| 2016/0114883 A1* | 4/2016 | Guerry | B81B 7/04 428/141 |
| 2016/0137292 A1* | 5/2016 | Teich | B64C 21/06 244/130 |
| 2017/0217569 A1 | 8/2017 | Gueuning et al. | |
| 2018/0194457 A1 | 7/2018 | Gueuning et al. | |
| 2018/0265208 A1* | 9/2018 | Yousef | B64D 33/02 |
| 2019/0202566 A1* | 7/2019 | Heck | B64C 5/02 |
| 2020/0010175 A1* | 1/2020 | Sanz Martinez | B64D 33/02 |
| 2020/0055591 A1* | 2/2020 | Hui | B64C 21/08 |

FOREIGN PATENT DOCUMENTS

| | | |
|---|---|---|
| EP | 0436243 | 7/1991 |
| EP | 0 599 502 | 6/1994 |
| GB | 2561880 | 10/2018 |
| WO | 2015/024601 | 2/2015 |
| WO | 2015/198296 | 12/2015 |

OTHER PUBLICATIONS

Combined Search and Examination Report for GB 1902926.3, dated Aug. 28, 2019, 4 pages.

* cited by examiner

AEROFOIL LEADING EDGE STRUCTURES

CROSS RELATED APPLICATION

This application claims priority to United Kingdom (GB) Patent Application 1902926.3, filed Mar. 5, 2019, the entire contents of which is hereby incorporated by reference.

TECHNICAL FIELD

The present invention relates to a leading edge structure for an aerofoil, to an aircraft wing comprising such a leading edge structure, and to an aircraft.

BACKGROUND

There is continued focus in the aviation industry on reducing the fuel consumption and emissions of aircraft. It is possible to reduce fuel consumption and emissions by reducing the airframe drag, which can be achieved by ensuring laminar flow over the windswept surfaces of the aerodynamic structures of the aircraft (e.g. wings, vertical and horizontal tailplanes, nacelles and the like). The shape of an aerodynamic structure can be designed to help maintain a laminar boundary layer.

Hybrid laminar flow control (HLFC) systems have been considered for aircraft in an attempt to stabilize the laminar boundary layer. These systems typically work by applying a negative pressure to the inner surface of the aircraft skin, at the windswept surfaces. The term "negative pressure" in this context refers to a pressure less than the pressure at the windswept surface (i.e. negative with respect to a zero-referenced pressure at the windswept surface). The negative pressure can be applied, for example, by sucking air through a porous aircraft skin. The suction can be achieved either by passive or active means.

It is also desirable to provide heating systems at the leading edges of aircraft wings, to limit or prevent the build-up of ice on the wing surface. It is known to direct hot bleed air from the engines to the underside of the wing skin at the leading edge to heat the leading edge and thereby prevent ice accumulation. Alternatively, electro-thermal systems which use resistive circuits applied to or embedded in the wing skin can be employed to heat the leading edge.

Aircraft wings are typically constructed as a load-bearing central box structure (wing box), to which leading edge structures and trailing edge structures are attached. As well as forming the leading edge part of the aerofoil shape, the leading edge structures of an aircraft wing typically house various systems including anti-icing systems, electrical systems, actuation systems for moveable devices and also any hybrid laminar flow control systems. The available space within the leading edge is limited, so for most wing designs it is challenging to accommodate a hybrid laminar flow control system and an ice protection system in the leading edge structure.

SUMMARY

A first aspect of the present invention provides a leading edge structure for an aerofoil. The leading edge structure comprises a skin configured to form an external aerodynamic surface of the aerofoil. The skin comprises a plurality of first regions interleaved with a plurality of second regions. Each first region comprises a plurality of holes extending through the skin, and each second region comprises an electrical heating system configured to increase the temperature of the skin.

Optionally, each of the first and second regions comprises a strip having a long axis substantially parallel to a spanwise axis of the leading edge structure.

Optionally, each of the first and second regions comprises a strip having a long axis substantially parallel to a profile direction of the leading edge structure.

Optionally, each first region forms a wall of an enclosed chamber provided within the leading edge structure, such that the holes provide an air flow path between the interior of the chamber and the exterior of the leading edge structure.

Optionally, each chamber is configured to be fluidically connectable to a suction pump of a hybrid laminar flow system.

Optionally, at least one chamber provided within the leading edge structure has a wall formed by at least two first regions and at least one second region. Optionally, at least the two first regions forming the wall of the at least one chamber are each smaller than other first regions of the leading edge structure; and/or the at least one second region forming the wall of the at least one chamber is smaller than other second regions of the leading edge structure.

Optionally, at least one chamber comprises a hollow duct have a long axis parallel to a spanwise axis of the leading edge structure, or parallel to a profile direction of the leading edge structure. Optionally, the at least one chamber comprises a stringer.

Optionally, each second region comprises a plurality of electrically conductive elements extending across that second region. Optionally, the electrically conductive elements form a mesh.

Optionally, the electrical heating systems are comprised in a wing ice protection system.

A second aspect of the invention provides an aircraft wing comprising a leading edge structure according to the first aspect.

Optionally, the aircraft wing further comprises a hybrid laminar flow control system having a suction pump in fluid communication with the holes.

A third aspect of the invention provides an aircraft comprising an aircraft wing according to the second aspect.

BRIEF DESCRIPTION OF THE DRAWINGS

Embodiments of the invention will now be described, by way of example only, with reference to the accompanying drawings, in which:

FIG. 1b is a schematic front view of the example leading edge structure of FIG. 1a;

FIG. 1c is a schematic view of an example second region of the example leading edge structure of FIG. 1a;

DETAILED DESCRIPTION

The examples described herein relate to leading edge structures for aerofoils. Each leading edge structure according to the invention comprises a skin configured to form an external aerodynamic surface of the aerofoil. The skin comprises a plurality of first regions interleaved with a plurality of second regions. Each first region comprises a plurality of holes extending through the skin. Each second region comprises an electrical heating system configured to increase the temperature of the skin. These features enable a hybrid laminar flow control suction system to be integrated alongside an electro-thermal wing ice protection system in a leading edge structure, in a space-efficient manner. Furthermore, example leading edge structures according to the invention may be simple to manufacture using conventional techniques. In particular, interleaving the regions which comprise holes with other regions in which an electrical heating system is present allows both heating and suction to be provided across substantially the entire external surface of the leading edge structure, without requiring holes to be created in any regions where an electrical heating system is present. This is advantageous because it is difficult to create holes in a region where an electrical heating system is present without breaking conductive elements of the electrical heating system and thus impairing the functionality of the electrical heating system.

Figure 1A:
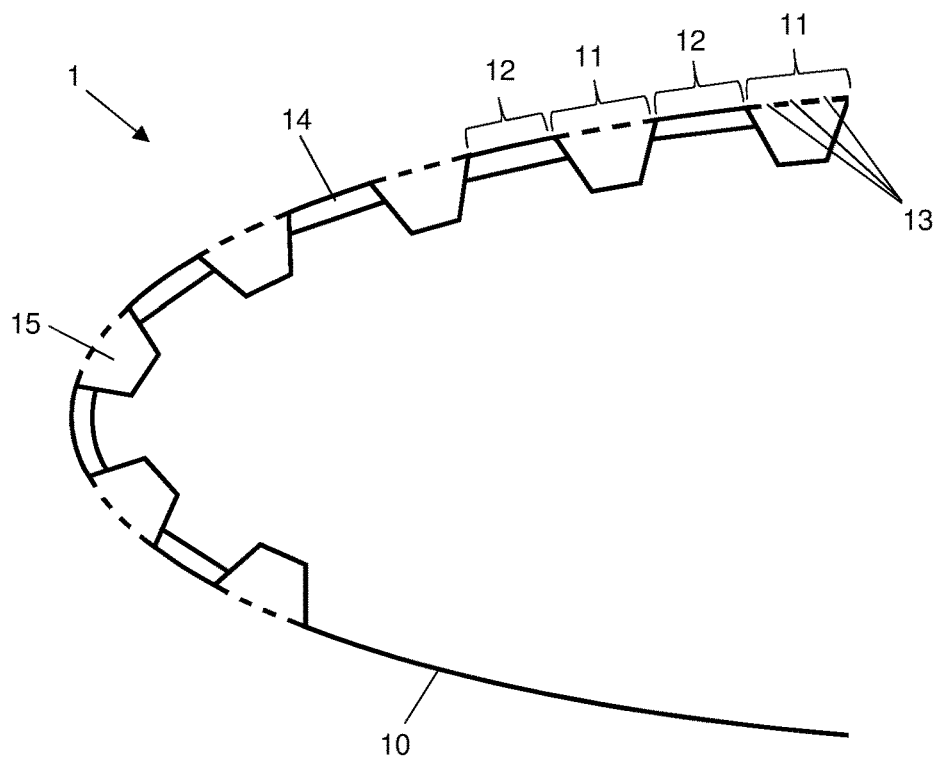
FIG. 1a is a schematic cross-section through an example leading edge structure according to the invention.

FIG. 1a is a cross-section through a first example leading edge structure 1 according to the invention. The leading edge structure 1 comprises a skin 10 which is configured to form an external aerodynamic surface of an aerofoil, such as an aircraft wing, tailplane, or vertical stabilizer. In particular, the skin of the leading edge structure may form the leading edge external surface of the aerofoil. The skin 10 may be formed from a composite material. The skin 10 may have a substantially standard construction, according to any design known in the aerospace field for forming aircraft wings.

The skin 10 comprises a plurality of first regions 11 and a plurality of second regions 12. The regions 11 and 12 are non-overlapping. The first regions 11 are interleaved with the second regions 12. That is, the first regions 11 and second regions 12 are arranged alternately, such that, in general, any given first region 11 will be between two second regions 12, or between an edge of the skin and a second region 12, and vice versa. In any case, a first region 11 will not be adjacent another first region 11, and a second region 12 will not be adjacent another second region 12.

Figure 1B:
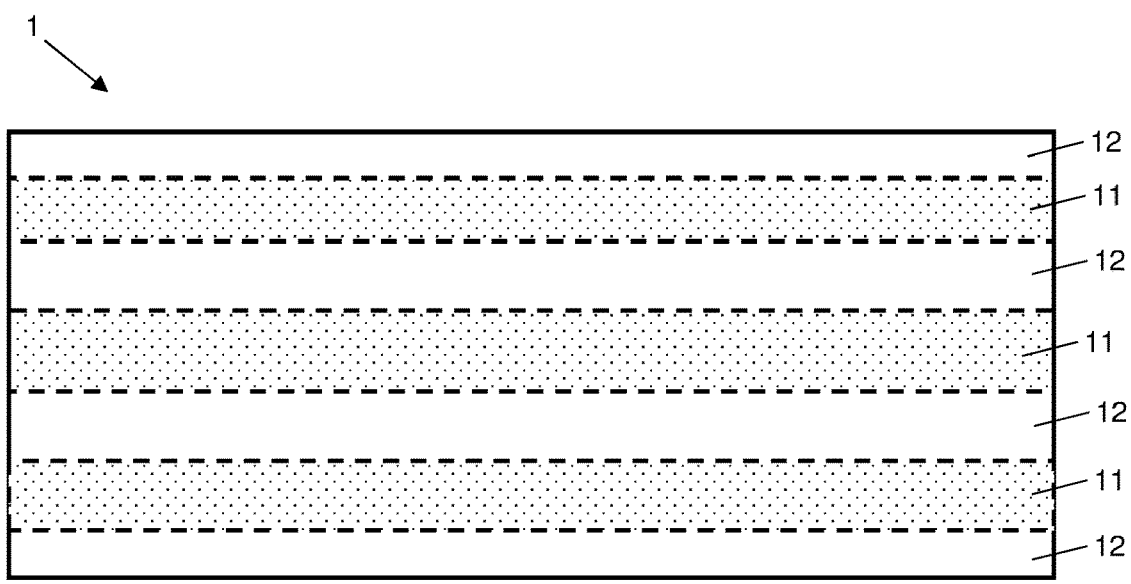

FIG. 1b shows a front view of the example leading edge structure 1. This view shows that each of the first and second regions 11, 12 comprises a strip having a long axis substantially parallel to a spanwise axis of the leading edge structure 1. The short axis of each strip is perpendicular to the spanwise axis. The direction of this short axis in the plane perpendicular to the spanwise axis varies (due to the curvature of the leading edge structure 1) in dependence on the location of a particular strip on the profile of the leading edge structure. For example, a strip located near the foremost part of the leading edge structure may have a short axis that is nearly vertical, whereas a strip located near the rearmost part of the leading edge structure may have a short axis that is nearly horizontal. For ease of reference, any axis (or direction) aligned with the leading edge profile will be referred to as a "profile" axis (or direction). In the particular example of FIG. 1b each strip has substantially the same configuration (that is, the length in the spanwise direction and the length in the profile direction of each strip is substantially the same), but this need not be the case in other examples. In some examples the first regions 11 may have a greater profile and/or spanwise length than the second regions 12, or vice versa. In some examples the profile and/or spanwise length of the first regions 11 may vary (that is, not all of the first regions 11 have the same profile and/or spanwise length); and/or the profile and/or spanwise length of the second regions 12 may vary (that is, not all of the second regions 12 have the same profile and/or spanwise length).

Each first region 11 comprises a plurality of holes 13 extending through the skin 10. Each hole comprises a micro hole. Each hole 13 connects a space within the leading edge structure 10 to the external environment of the leading edge structure 10 such that air may flow therebetween. The holes 13 enable air to be sucked into the leading air structure by a hybrid laminar flow control system. The exact shape, size, number and arrangement of holes may be selected based on the requirements of the particular application. The holes may be created by laser-drilling, or any other suitable technique.

The particular example leading edge structure 10 comprises a plurality of enclosed chambers 15 within the leading edge structure 10. Each first region 11 forms a wall of one of the chambers 15, such that the holes 13 in that first region provide an air flow path between the interior of that chamber 15 and the exterior of the leading edge structure 10. Each chamber 15 comprises a hollow duct having a long axis parallel to the spanwise axis of the leading edge structure. The walls of each chamber which are not formed by a first region 11 are formed by a stringer. The stringers may be co-cured with the skin 10.

Each second region 12 comprises an electrical heating system 14 configured to increase the temperature of the skin 10. Each second region 12 comprises a plurality of electrically conductive elements (such as wires or tracks) extending across that second region. The electrically conductive elements may be embedded in a matrix material (such as a thermoplastic material). The matrix material may be separate from the skin 10 and may be adhered to either the inner or the outer surface of the skin 10, or the material of the skin 10 may itself be the matrix material. In some examples the electrically conductive elements may be formed as a mesh, or any other configuration which facilitates a substantially even distribution of electrically conductive elements over a second region 12.

Figure 1C:
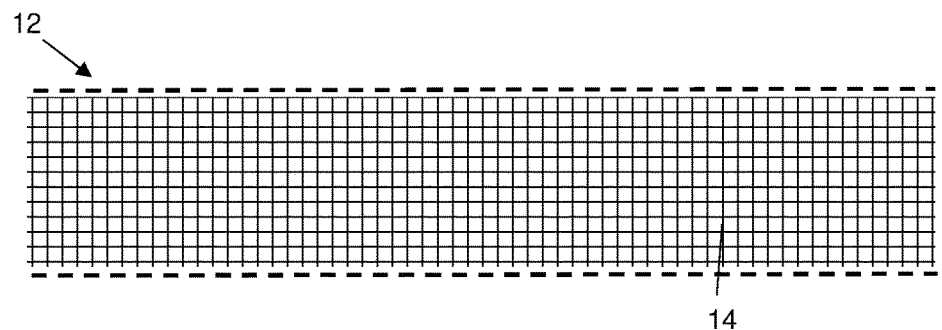

FIG. 1c shows one of the second regions 12 in isolation from the rest of the leading edge structure 10. The other second regions 12 of the leading edge structure 10 are substantially identical to the illustrated second region 12. In the illustrated example, each electrical heating system 14 comprises a heater mat provided on the interior surface of the skin 10. In other examples, one or more of the heater mats could be provided on the exterior surface of the skin 10. The area of each heater mat is substantially equal to the area of the corresponding second region 12. Each heater mat comprises a mesh of wires embedded in a flexible thermoplastic matrix. The mesh of wires extends across substantially the entire area of the heater mat. The heater mats are attached to the skin by any suitable technique, such as bonding. In other examples, the conductive elements may be embedded in the material of the skin 10.

Figure 2:
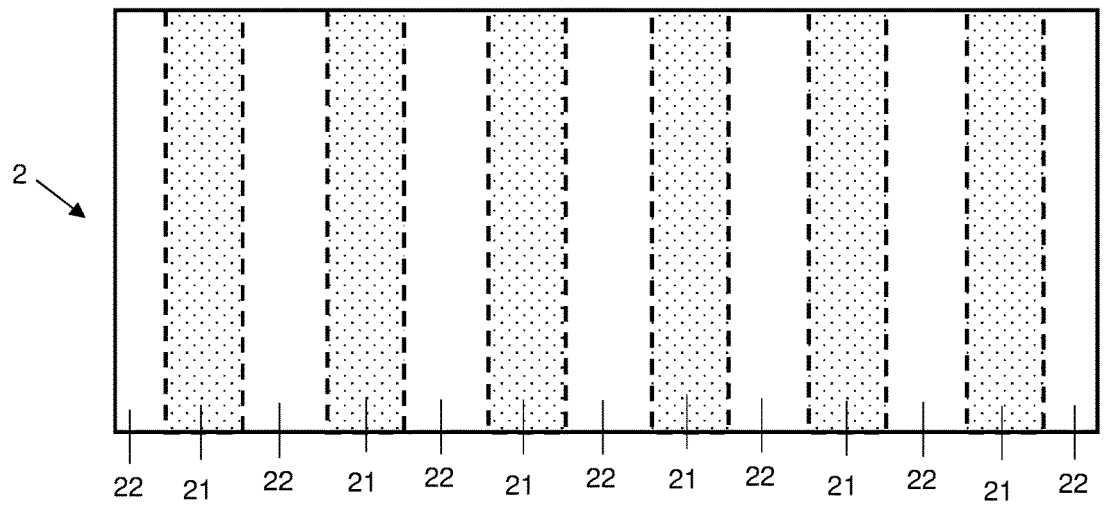
FIG. 2 is a schematic front view of a further example leading edge structure according to the invention.

FIG. 2 is a front view of an alternative example leading edge structure 2 according to the invention. The leading edge structure 2 comprises a plurality of first regions 21 and a plurality of second regions 22. The leading edge structure 2 has substantially the same construction as the example leading edge structure 1 of FIGS. 1a-c, except that each first and second region 21, 22 comprises a strip having a long axis substantially parallel to a profile direction of the leading edge structure. Consequently, the ducts (not shown) which form the enclosed chambers provided within the leading edge structure 2 are curved along their length rather than substantially straight.

Figure 3:
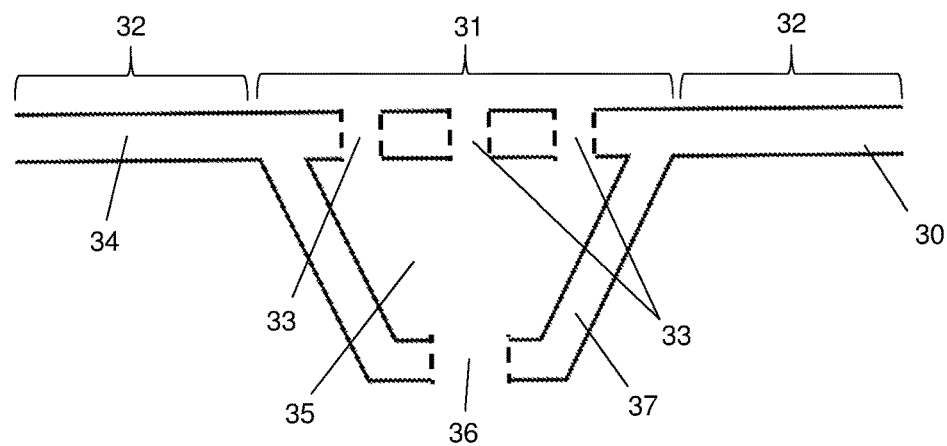
FIG. 3 is a schematic cross-section through part of an example leading edge structure according to the invention.

FIG. 3 is a cross-section through an example chamber 35 of an example leading edge structure according to the invention. One wall of the chamber 35 is formed by a first region 31 of a skin 30 of the leading edge structure. The first region 31 is bordered by two second regions 32, which do not form walls of the chamber 35. The first region 31 is in the form of a strip, the long axis of which may be parallel to either a spanwise or a profile direction of the leading edge structure. The first region 31 comprises a plurality of holes 33 distributed across substantially the entire area of the first region 31, which provide air flow paths between the interior of the chamber and the exterior of the leading edge structure. The first region 31 may have substantially the same features as the example first region 11 described above.

The other walls of the chamber 35 are formed by a hollow duct 37 which extends along the full length of the long axis of the first region 31. The duct 37 may comprise a stringer, and may be formed integrally with the skin 30. The chamber 35 is configured to be fluidically connectable to a suction pump of a hybrid laminar flow system. In particular, the duct 37 comprises at least one opening 36 into the chamber, which is connectable (e.g. via a further duct, hose, or the like) to a suction pump. In some examples the duct 37 comprises a plurality of such openings 36, distributed along the length of the duct 37. A leading edge structure in which the chamber 35 is comprised may additionally comprise one or more further chambers, each of which may have substantially the same features and construction as the illustrated chamber 35.

The leading edge of an aerofoil has a stagnation point, which is the location on the aerofoil profile at which the local velocity of the airflow over the aerofoil during flight is zero. For an aerofoil having spanwise extension, such as an aircraft wing, the stagnation point takes the form of a spanwise extending line. In order to achieve laminar flow and de-ice the wing, it is important to provide both heating and suction at the stagnation point. Examples in which the first and second regions have the form of profile-extending strips (such as the example leading edge structure 2 of FIG. 2) achieve this by alternating suction and heating along the spanwise axis of the leading edge structure. However; in examples in which the first and second regions have the form of spanwise-extending strips (such as the example leading edge structure 1 of FIGS. 1a-c) it may occur that the stagnation point falls centrally within a first region or a second region, such that mostly heating or mostly suction is provided at this point.

This situation could be avoided by ensuring that the regions are positioned such that the stagnation point lies on a boundary between a first region and a second region. Alternatively or additionally, the configuration and arrangement of the first and second regions may be tailored in the area surrounding the stagnation point, to ensure that sufficient suction and sufficient heating is provided at the stagnation point.

Figure 4:
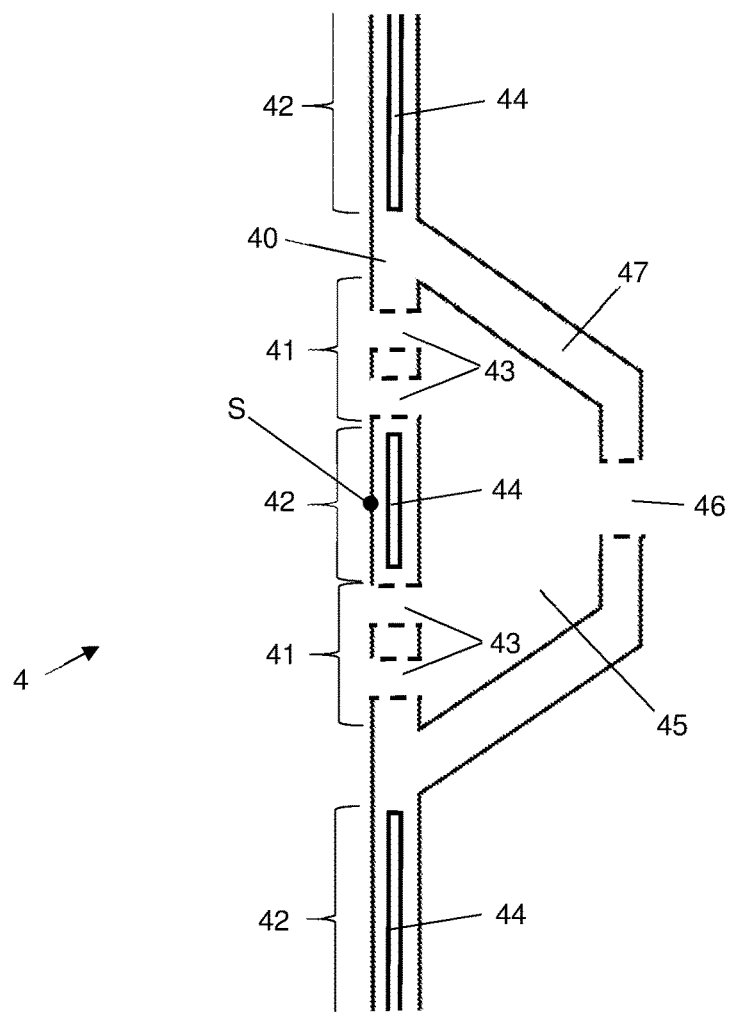
FIG. 4 is a schematic cross-section through part of a further example leading edge structure according to the invention.

FIG. 4 is a cross-section through a part of an example leading edge structure 4 which encompasses a stagnation point S. The leading edge structure 4 comprises first regions 41 having holes 43, and second regions 42 having electrical heating systems 44. The first regions 41 and the second regions 42 have substantially the same features as the first regions 11 and second regions 12 of the example leading edge structure 1.

The leading edge structure 4 additionally comprises a plurality of enclosed chambers (of which only the chamber 45 that is nearest the stagnation point S is visible in FIG. 4). At least the chamber 45 that is nearest the stagnation point S differs from the example chambers 15 and 35 described above in that a wall of the chamber 45 is formed by at least two first regions 41 and at least one second region 42. In the illustrated example, a wall of the chamber 45 is formed by two first regions 41 and one second region 42. The stagnation point S lies approximately centrally on the vertical axis of the second region 42, although this need not be the case in other examples. The other walls of the chamber 45 are formed by a hollow duct 47, which has substantially the same features as the example duct 37 of FIG. 3. In particular, the duct 47 comprises at least one opening 46 into the chamber 45, which is connectable (e.g. via a further duct, hose, or the like) to a suction pump.

In some examples, the first regions 41 which form the wall of the chamber 45 nearest the stagnation point are each smaller than the other first regions (not shown) of the leading edge structure 4. The second region 42 which forms the wall of the at least one chamber is also smaller (along at least one dimension) than the other second regions (not shown) of the leading edge structure. The area of the first and second regions 41, 42 forming the wall of the chamber 45 nearest the stagnation point S may be smaller than the area of other first and second regions of the leading edge structure 4.

In examples in which the first and second regions have the form of spanwise strips, the first and second regions 41, 42 forming the wall of the chamber 45 nearest the stagnation point S may have the same spanwise length as other first and second regions of the leading edge structure 4, but may be smaller in the profile direction. In some examples the profile length of the first regions 41 nearest the stagnation point S may be less than or equal to 50% of the profile length of other first regions in the leading edge structure 4 and the profile length of the second region 42 may be less than or equal to 50% of the profile length of other second regions in the leading edge structure 4. Reducing the profile length of the first and second regions 41, 42 nearest the stagnation point S increases the likelihood that sufficient heating and sufficient suction effects are provided at the stagnation point S in order to achieve good aerodynamic performance.

Figure 5:
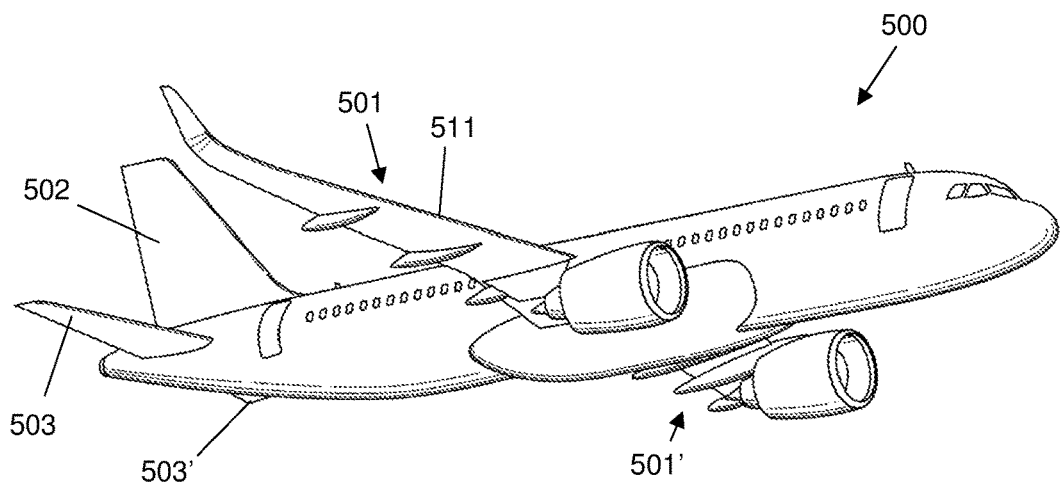
FIG. 5 is a perspective view of an example aircraft according to the invention.

FIG. 5 shows an example aircraft 500 having a wing 501. The wing 501 comprises a leading edge structure according to the invention, which may be any of the example leading edge structures described above. The wing 501 further comprises a hybrid laminar flow control (HLFC) system (not visible) having a suction pump in fluid communication with the holes of the leading edge structure and configured to draw air into the leading edge structure through the holes. Suction may therefore be applied to the boundary layer of air flowing over the wing 501 during flight of the aircraft 500, in order to resist separation of the boundary layer from the upper surface of the leading edge structure and thereby improve aerodynamic performance. Heating may also be applied to the leading edge structure, to prevent ice accumulation, by means of the electrical heating systems comprised in the leading edge structure.

The aircraft 500 also comprises further aerofoils—namely a further wing 501', a vertical stabilizer 502, and a pair of tailplanes 503, 503'. Any or all of these further aerofoils may comprise a leading edge structure according to the invention.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. A leading edge structure for an aerofoil, the leading edge structure comprising a skin configured to form an external aerodynamic surface of the aerofoil, wherein the skin comprises a plurality of first regions interleaved with a plurality of second regions, and wherein:
    each first region comprises a plurality of holes extending through the skin; and
    each second region comprises an electrical heating system configured to increase the temperature of the skin;
    each first region does not comprise an electrical heating system configured to increase the temperature of the skin; and,
    each second region does not comprise any holes extending through the skin.

2. A leading edge structure according to claim 1, wherein each of the first and second regions comprises a strip having a long axis substantially parallel to a spanwise axis of the leading edge structure.

3. A leading edge structure according to claim 1, wherein each of the first and second regions comprises a strip having a long axis substantially parallel to a profile direction of the leading edge structure.

4. A leading edge structure according to claim 1, wherein each first region forms a wall of an enclosed chamber provided within the leading edge structure, such that the holes provide an air flow path between the interior of the chamber and the exterior of the leading edge structure.

5. A leading edge structure according to claim 4, wherein each chamber is configured to be fluidically connectable to a suction pump of a hybrid laminar flow system.

6. A leading edge structure according to claim 4, wherein at least one chamber provided within the leading edge structure has a wall formed by at least two first regions and at least one second region.

7. A leading edge structure according to claim 6, wherein the at least two first regions forming the wall of the at least one chamber are each smaller than other first regions of the leading edge structure; and/or the at least one second region forming the wall of the at least one chamber is smaller than other second regions of the leading edge structure.

8. A leading edge structure according to claim 4, wherein at least one chamber comprises a hollow duct have a long axis parallel to a spanwise axis of the leading edge structure, or parallel to a profile direction of the leading edge structure.

9. A leading edge structure according to claim 8, wherein the at least one chamber comprises a stringer.

10. A leading edge structure according to claim 1, wherein each second region comprises a plurality of electrically conductive elements extending across that second region.

11. A leading edge structure according to claim 10, wherein the electrically conductive elements form a mesh.

12. A leading edge structure according to claim 1, wherein the electrical heating systems are comprised in an ice protection system for the aerofoil.

13. A leading edge structure according to claim 1, wherein said plurality of second regions comprises a stagnation point S positioned approximately centrally on a vertical axis of one said plurality of second regions.

14. An aircraft wing comprising a leading edge structure according to claim 1.

15. An aircraft wing according to claim 14, further comprising a hybrid laminar flow control system having a suction pump in fluid communication with the holes.

16. An aircraft comprising an aircraft wing according to claim 14.

* * * * *